United States Patent [19]

Sundt

[11] Patent Number: 4,504,932
[45] Date of Patent: Mar. 12, 1985

[54] GEOPHONE HAVING A NON-CONDUCTIVE COILFORM

[75] Inventor: Peter C. Sundt, Houston, Tex.

[73] Assignee: Metrix Instrument Co., Houston, Tex.

[21] Appl. No.: 346,698

[22] Filed: Feb. 8, 1982

[51] Int. Cl.³ .............................................. G01V 1/16
[52] U.S. Cl. ................................... 367/183; 367/187; 73/652
[58] Field of Search ............... 367/187, 183, 185, 186, 367/182; 73/652; 29/594

[56] References Cited

U.S. PATENT DOCUMENTS 3,913,063 10/1975 Sears .................................. 367/183
4,300,220 11/1981 Goff et al. .......................... 367/188

OTHER PUBLICATIONS

The American Heritage Dictionary, 1982, p. 1052.

Primary Examiner—Nelson Moskowitz
Assistant Examiner—Ian Lobo
Attorney, Agent, or Firm—Fulbright & Jaworski

[57] ABSTRACT

A geophone having a non-conductive coilform thereby avoiding the disadvantages of conductive coilform damping and allowing closer control of both sensitivity and damping solely through shunt loading of the sensing coil. The coilform is a molded plastic coilform of a high strength lightweight glass filled resin. The coilform is a dimensionally stable and temperature stable thermoplastic. Preferably, the coilform is of polyphenylene sulfide.

4 Claims, 2 Drawing Figures

GEOPHONE HAVING A NON-CONDUCTIVE COILFORM

BACKGROUND OF THE INVENTION

In reflection seismography it is common practice to employ at each ground station a plurality of geophones arranged in a grid pattern (array) and electrically connected in series-parallel. In this arrangement, vertically travelling compression waves (reflections) are received by all the geophones in the array simultaneously, while undesirable horizontal waves are received out of phase and are partially cancelled. For this method to work properly it is important that all the geophones in the array be matched in natural frequency, sensitivity and damping.

In conventional geophones, damping is accomplished in two ways. Most of the required damping is obtained by utilizing a conductive metal coilform, which acts as a low resistance shorted turn in the magnetic field. The remainder of the damping is provided by shunt loading of the sensing coil.

In the first way, using a conductive metal coilform, open circuit damping is provided by eddy currents induced in the metal coilform. Unfortunately, this is an effect that is difficult to control. Variations in the cross-sectional area of the coilform due to machining tolerances, variations in the electrical conductivity of the metal coilform alloy and ambient temperature changes, approximately a 4% resistance change for each 10° C., all affect the resistance of the coilform and thereby the open circuit damping. Furthermore, coils wound on metal coilforms are subject to high voltage damage caused by breaking down the insulation between the winding coil and the coilform.

The present invention is directed to providing a geophone with a non-conductive coilform in which the coilform includes the properties of (1) lightweight whereby full damping can be accomplished solely by shunt loading of the sensing coil, (2) greater dielectric strength with greater protection against high voltage damage, (3) temperature stable, and (4) free of non-uniformities caused by conductive coilform damping, and (5) is a high strength and dimensionally stable plastic.

SUMMARY

It is an object of the present invention to provide a geophone having a case with a magnetic field producing means secured to the case, a coilform connected to the case by spring means which allow axial movement of the coilform relative to the case but which restrict lateral movement of the coilform and an electrical coil carried by the coilform for movement in the magnetic field in which the coilform is a non-conductive molded plastic coilform. The coilform is preferably made of a high strength, light weight, glassfiber-filled resin. The coilform is a dimensionally stable and temperature stable thermoplastic. Preferably, the coilform is of a polyphenylene sulfide.

A still further object of the present invention is the provision of a non-conductive coilform which avoids the disadvantages and non-uniformities of conductive coilform damping and allows closer control of both the sensitivity and damping solely through the use of shunt loading of the sensing coil.

Other and further objects, features and advantages will be apparent from the following description of a presently preferred embodiment of the invention, given for the purpose of disclosure and taken in conjunction with the accompanying drawing.

DESCRIPTION OF THE PREFERRED EMBODIMENT

Figure 1:
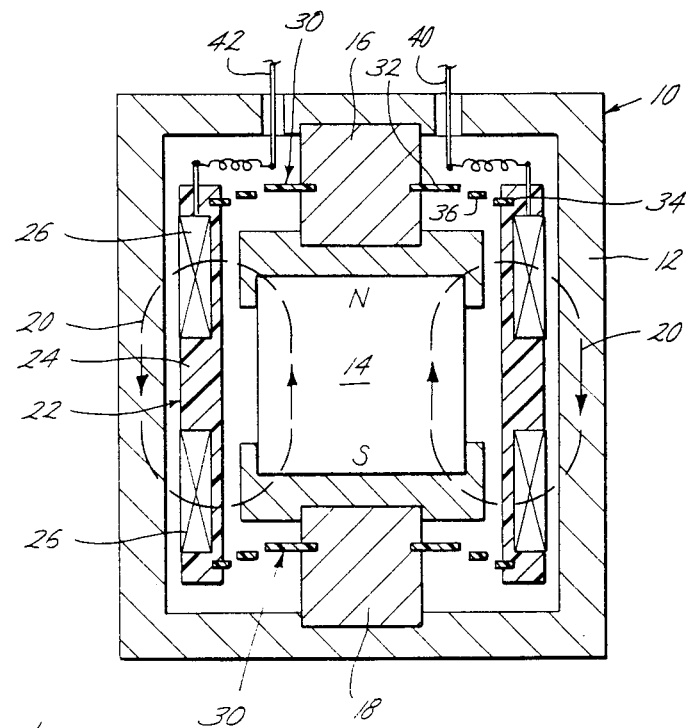
FIG. 1 is an elevational view, in cross section, of a schematic of the geophone of the present invention.
Figure 2:
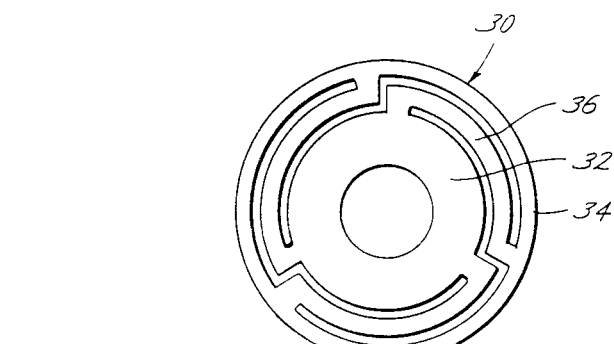
FIG. 2 is a top elevational view of the preferred form of the mounting springs of the present invention.

Referring now to the drawing and particularly to FIG. 1, the reference numeral 10 generally indicates the geophone of the present invention. As is generally conventional, the geophone 10 includes a case 12 having a magnetic field producing means such as a permanent magnet 14 secured to the case 12 by upper and lower supports 16 and 18. The magnet 14 creates a magnetic field schematically illustrated by the lines 20. A coil bobbin 22 is provided which includes the coilform 24 which support coils 26. The bobbin 22 is suspended in the magnetic field 20 from each end by circular flat springs 30. As best seen in FIG. 2 the springs 30 preferably include an inner ring 32, an outer ring 34. The inner and outer rings 32 and 34 are connected together by one or more annular flexures 36. The inner ring 32 is attached to the case 20 and the outer ring 34 is attached to the bobbin 22 or vice versa. The spring 30 is relatively stiff in the lateral direction and is very compliant in the axial direction. Thus the bobbin 22 is restrained radially from engaging the case 12, but is allowed to move relative to the case in the axial direction. When the case 12 of the geophone 10 is vibrated in the axial direction at a frequency greater than the mechanical natural frequency of the suspension, the inertia of the bobbin 22 causes the bobbin 22 to remain fixed in space. The moving magnetic field 20 cuts the turns of the coils 26 and generates a voltage at the output terminals 40 and 42 which is proportional to the instantaneous velocity of the case 12.

In conventional geophones, damping is accomplished in two ways. Most of the required damping is obtained by utilizing a conductive metal coilform which acts as a low resistance shorted turn in the magnetic field to provide open circuit damping. The remainder of the damping is provided by shunt loading of the sensing coils with a resistor. The total damping effect is given in the following expression:

$$b_t = b_o + \frac{e^2}{2(R_c + R_s) M W_n}$$

Where:
 $b_t$ = total damping ratio
 $b_o$ = open circuit damping ratio
 e = coil sensitivity—volts/m/s
 $R_c$ = coil resistance—ohms
 $R_s$ = shunt resistance—ohms
 M = mass of bobbin—Kg
 $W_n$ = natural frequency—radians/s In this expression ($b_o$) is the open circuit damping ratio and is provided by eddy currents induced in the metal coilform. However, this is an effect that is difficult to control. Variations in the cross-sectional area of the coilform due to machining tolerances, and variations in the electrical conductivity of the metal alloy both affect the electrical resistance of the coilform and thereby affect the open circuit damping. Changes in ambient temperature also cause changes in the resistance of the coilform (approximately a 4% resistance change for each 10° C. in temperature) with a proportional effect on the damping. If the open circuit damping is not constant, geophone to geophone, it is very difficult and time consuming to adjust the second term in the damping expression to obtain the total required damping while holding the geophone sensitivity constant.

In the present invention the coilform 24 is non-conductive, and all of the required damping is obtained by shunt loading of the sensing coil by a suitable resistor. The open circuit damping ($b_o$) is essentially zero. Therefore, the total damping ratio is given by the single expression:

$$b_t = \frac{e^2}{2(Rc + Rs) M W_n}$$

Assuming that the mass (M), natural frequency ($W_n$) and circuit resistance (Rc+RS) are held constant, it is seen that there is a fixed relationship between the coil sensitivity (e) and the total damping ($b_t$). In the present invention, therefore, it is a simple matter to produce geophones 10 that are matched in both sensitivity and damping. Additional advantages of this invention are: (a) less change in damping with temperature variations; (b) greater dielectric strength, since the coil is wound on a non-conductive coilform, thereby providing greater protection against high voltage damage; (c) lightweight bobbin whereby the mass is low and can be suitably dampened by shunt loading; (d) non-uniformities in the coilform do not adversely affect the damping and (e) is a plastic of high strength and is dimensionally stable.

The coilform 24 is made of a non-conductive molded plastic such as a high strength, lightweight glass-filled resin. Any suitable dimensionally stable and temperature stable thermoplastic can be used. However, it is preferable that the coilform 24 of the present invention be made of polyphenylene sulfide such as sold by Phillips Petroleum Company under the trademark "Ryton". The present geophone 10 does not rely on conductive coilform damping but employs a non-conductive coilform 24 which is damped solely by shunt loading the sensing coils 26. The geophone 10 is therefore free of the non-uniformities of coilform damping caused by variations in dimensions and electrical conductivity. The molded coilform 24 is very lightweight and the moving bobbin 22 in one embodiment weighs only 6.8 grams which results in lower shock forces on the moving part occurring in field handling, thereby providing longer life.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. In a geophone having a case having magnetic field producing means secured to the case, a coilform connected to the case by spring means which allow axial movement of the coilform relative to the case but which restrict lateral movement of the coilform, an electric coil carried by the coilform for movement in the magnetic field, the improvement in the coilform comprising,
   said coilform being entirely of a non-conductive molded plastic coilform having near zero open circuit dampening.
2. The apparatus of claim 1 wherein the coilform is a high strength, lightweight glass-filled resin.
3. The apparatus of claim 2 wherein the coilform is a dimensionally stable and temperature stable thermoplastic.
4. The apparatus of claim 1 wherein the coilform is a polyphenylene sulfide.

* * * * *